US00RE38573E1

(19) United States
(12) Reissued Patent
Wells

(10) Patent Number: US RE38,573 E
(45) Date of Reissued Patent: Aug. 31, 2004

(54) QUICK RELEASE SKI POLE AND STRAP SYSTEM

(76) Inventor: Galen Wells, 9116 NE. 96th St., Vancouver, WA (US) 98662

( * ) Notice: This patent issued on a continued prosecution application filed under 37 CFR 1.53(d), and is subject to the twenty year patent term provisions of 35 U.S.C. 154(a)(2).

(21) Appl. No.: 09/140,831

(22) Filed: Aug. 26, 1998

Related U.S. Patent Documents

Reissue of:
(64) Patent No.: 5,549,330
Issued: Aug. 27, 1996
Appl. No.: 08/413,919
Filed: Mar. 29, 1995

U.S. Applications:
(62) Division of application No. 08/154,865, filed on Nov. 18, 1993, now Pat. No. 5,443,287.

(51) Int. Cl.[7] ..... A63C 11/22

(52) U.S. Cl. ..... 280/822

(58) Field of Search ..... 280/816, 821, 280/822; 135/65, 72; 274/25

(56) References Cited

U.S. PATENT DOCUMENTS

| | | | | |
|---|---|---|---|---|
| 3,085,814 A | | 4/1963 | Scott | |
| 3,163,436 A | | 12/1964 | Shride et al. | |
| 3,181,880 A | | 5/1965 | Cameron et al. | |
| 3,232,632 A | | 2/1966 | Lewis | |
| 3,290,049 A | | 12/1966 | McDonald | |
| 3,297,333 A | | 1/1967 | Schwedt et al. | |
| 3,451,688 A | | 6/1969 | McDonald | |
| 3,540,751 A | | 11/1970 | Pierce | |
| 3,545,784 A | | 12/1970 | Alsop | |
| 3,560,014 A | | 2/1971 | Bruckl | |
| 3,565,451 A | | 2/1971 | Giambazi | |
| 3,685,850 A | | 8/1972 | Kepka et al. | |
| 3,746,356 A | | 7/1973 | Shipstad | |
| 3,874,686 A | | 4/1975 | Shipstad et al. | |
| 3,899,904 A | * | 8/1975 | Brimhall, II | 280/821 X |
| 3,923,317 A | | 12/1975 | Penney | |
| 3,982,747 A | * | 9/1976 | Schweinsberg | 280/822 |
| 3,992,021 A | | 11/1976 | Tobin | |
| 3,995,872 A | | 12/1976 | Joseph | |
| 4,005,872 A | * | 2/1977 | Rischert et al. | 280/822 |
| 4,037,850 A | | 7/1977 | Haberlin | |
| 4,061,347 A | | 12/1977 | Stern et al. | |
| 4,206,445 A | | 6/1980 | Steinhauer | 340/821 |
| 4,244,602 A | | 1/1981 | Allsop et al. | 280/821 |
| 4,288,100 A | | 9/1981 | Aho | 280/821 |
| 4,288,101 A | | 9/1981 | Aho | 280/821 |
| 4,315,641 A | | 2/1982 | Larsen | 280/822 |
| 4,343,490 A | | 8/1982 | Adamson | 280/821 |
| 4,391,456 A | | 7/1983 | Moor | 280/821 |

(List continued on next page.)

FOREIGN PATENT DOCUMENTS

| | | | | |
|---|---|---|---|---|
| DE | 2656814 | | 12/1976 | |
| DE | 26 18 723 A1 | | 11/1977 | |
| DE | 4103235 | * | 8/1992 | 280/822 |
| EP | 0370900 A1 | | 5/1990 | |
| FR | 2270913 | * | 12/1975 | 280/822 |
| FR | 2594-702 A | | 8/1987 | |
| JP | 4051976 | * | 2/1992 | 280/822 |

*Primary Examiner*—Frank Vanaman
(74) *Attorney, Agent, or Firm*—Marger Johnson & McCollom, PC

(57) ABSTRACT

A quick release skip pole strap system includes a novel ski pole strap that attaches to a ski pole grip. A locking mechanism within the ski pole grip automatically engages with a strap pin. A button attached to a side of the ski pole grip, when depressed, causes the strap pin to automatically eject from the ski pole grip decoupling the skier from the ski pole. The skier can depress the button without having to remove his hands from the ski pole grips. The ski pole strap in one embodiment is made of an elastic material that automatically pulls the pin from the ski pole grip and holds the ski pole in a "ready to plant" position.

12 Claims, 5 Drawing Sheets

U.S. PATENT DOCUMENTS

| | | | | | |
|---|---|---|---|---|---|
| 4,493,494 | A | | 1/1985 | Feagin, Jr. | 280/821 |
| 4,572,545 | A | | 2/1986 | Dooley, Jr. et al. | 280/821 |
| 4,597,589 | A | | 7/1986 | Fujii et al. | 280/821 |
| 4,613,156 | A | | 9/1986 | Lajos | 280/821 |
| 4,641,857 | A | | 2/1987 | Gailiunas | 280/821 |
| 4,645,235 | A | | 2/1987 | Joseph | 280/821 |
| 4,657,282 | A | | 4/1987 | Koch | 280/821 |
| 4,728,123 | A | | 3/1988 | Kassal et al. | 280/822 |
| 4,731,766 | A | * | 3/1988 | Bunyea | 280/816 |
| 4,775,168 | A | | 10/1988 | Dalebout | 280/821 |
| 4,779,896 | A | | 10/1988 | Ingalls | 280/821 |
| 4,790,562 | A | | 12/1988 | Skard | 280/821 |
| 5,029,898 | A | | 7/1991 | Grignon et al. | 280/821 |
| 5,092,629 | A | | 3/1992 | Bagneres et al. | 280/821 |
| 5,110,154 | A | | 5/1992 | Street | 280/822 |
| 5,123,674 | A | | 6/1992 | Bagneres et al. | 280/821 |
| 5,248,163 | A | | 9/1993 | Dondero | 280/821 |
| 5,294,152 | A | * | 3/1994 | Jacobs | 280/822 X |
| 5,312,134 | A | | 5/1994 | Goode et al. | 280/822 |
| 5,326,134 | A | * | 7/1994 | Hiser | 280/822 |
| 5,328,205 | A | * | 7/1994 | Bacharach | 280/822 |
| 5,470,108 | A | | 11/1995 | Goode et al. | 280/823 |

* cited by examiner

QUICK RELEASE SKI POLE AND STRAP SYSTEM

Matter enclosed in heavy brackets [ ] appears in the original patent but forms no part of this reissue specification; matter printed in italics indicates the additions made by reissue.

This is a division of commonly signed application Ser. No. 08/154,865 entitled QUICK RELEASE SKI POLE AND STRAP SYSTEM filed Nov. 18, 1993, now U.S. Pat. No. 5,443,287.

BACKGROUND OF THE INVENTION

This invention relates generally to ski equipment and more particularly to a system for attaching a ski pole to the hand of a skier. Standard ski poles include a leather strap that is wrapped around the skiers wrist. The skier inserts a hand through the strap and then wraps his hand around a grip on the top end of the ski pole. The strap holds the ski pole to the skier in the event that the skier's hand dislodges from the ski pole grip.

For example, when the skier falls during a ski run his hands typically looses hold of the ski pole grip. The strap, however, remains wrapped around the skier's wrist keeping the pole attached to the skier as he falls down the slope. Thus, the skier does not have to traverse back up the hill to retrieve ski poles that have been inadvertently released at the beginning of the fall.

U.S. Pat. No. 3,085,814 to Scott shows a typical ski pole strap 17 wrapped around the wrist while the skier's hand is wrapped around a ski pole grip 10. The problem with standard ski pole straps as shown in Scott, is that they are difficult to remove from the skier's wrist. For example, the strap must be securely wrapped around the skier's hand so that it does not easily fall off during a ski run mishap. However, because the strap is securely wrapped around the skier's wrist, it is difficult for the skier to remove the strap, especially while wearing heavy gloves or mittens.

For safety reasons, ski resorts require that ski straps be removed before entering a ski lift. Because it is awkward and time consuming for a skier to remove the ski pole strap from the wrist, the skier must begin the process of removing the strap a good deal of time before actually being seated on a ski lift. If the ski lift line is relatively short or does not exist, a skier can ski directly up to the ski lift and immediately be seated on a ski lift chair. Therefore, to save time, skiers remove ski pole straps while still skiing down the mountain so that the straps are removed before reaching the ski lift.

Removing ski straps at the end of a ski run is hazardous since the skier's attention is distracted from the normal skiing process. Having to remove ski straps while skiing also reduces the skiers enjoyment during the latter part of the ski run.

Because the ski strap is just as difficult to attach as to remove, the skier upon exiting from a ski lift must stop and engage each hand through the corresponding strap before beginning the next ski run. Having to continuously attach and detach ski straps wastes time that could be used skiing and in general is a hindrance that reduces the overall enjoyment of the skiing experience.

To reduce the amount of time and the inconvenience of attaching and removing ski straps, various strapless ski pole grips have been developed. For example, U.S. Pat. No. 3,992,021 to Tobin shows a molded ski pole grip that wraps around the outside of a skier's hand. While the ski pole grip provides additional support for holding the skier's hand in the ski pole grip, the ski pole still releases when the skier's hand no longer is wrapped around the ski pole grip. Therefore, if the skier releases the ski pole grip during a fall, the ski pole typically remains at the initial location of the mishap. Thus, if the skier tumbles down the hill, he still must climb back up the hill to retrieve the ski poles.

U.S. Pat. No. 5,123,674 to Bagneres et al. and U.S. Pat. No. 5,110,154 to Street show various locking mechanisms that are used to attach a skier's wrist or glove to a ski pole grip. For example, Bagneres, et al. shows a strap that couples directly to a slot in the ski pole grip. Alternatively, Street shows a clip that attaches to a mating latch formed on a ski pole grip. The attachment mechanisms in both Bagneres, et al. and Street, however, are more difficult to remove than the standard strap shown in Tobin.

U.S. Pat. No. 4,779,896 to Ingalls shows a spring activated pin that is locked vertically into the top of a ski pole grip. The pin 37 is disengaged by pressing down on the top of the pin 37 with the skiers thumb. The pin, however, is not automatically ejected from the ski pole grip 10 after being depressed. Therefore, the skier must grab the pin 37 or strap 49 with one hand and manually pull the pin out of a slot in the ski pole grip. In addition, the positioning of the ski strap 49 makes it awkward for a skier to move his thumb around the strap 49 and over pin 37. Because depression of pin 37 unlocks the pin from the ski pole grip, the system is subject to inadvertent release in a crash.

Thus, in Bagneres et al., Street, and Ingalls, the skier is faced with the same problems arising with standard ski pole straps. Namely, that the strap is difficult and awkward to remove.

Accordingly, a need remains for a quick release ski pole strap that quickly and reliably detaches from a ski pole grip.

SUMMARY OF THE INVENTION

It is, therefore, an object of the invention to reduce the amount of time required to detach a ski pole strap from a skier's wrist.

Another object of the invention is to automatically disengage a ski strap from a ski pole while both hands of the skier remain wrapped around the ski pole grips.

A further object of the invention is to reduce the amount of time it takes to attach a ski strap to a ski pole grip.

A quick release ski pole strap system includes a novel ski pole strap that attaches to a ski pole by inserting a strap pin into a channel on a ski pole grip. The ski pole grip has a front and back side joined by lateral sides. A locking mechanism within the ski pole grip automatically engages with the strap pin. A button attached in the ski pole grip is depressed causing the strap pin to automatically eject from the ski pole grip.

Thus, the skier is quickly decoupled from the ski pole. The skier then has the option of waiting until the last moment before disengaging the ski strap from the ski pole grip.

In one embodiment, the channel extends from the front to the back of the ski pole grip and the button is located on the lateral side of the ski pole grip. This unique channel/button configuration allow each ski pole to be used in either the right or left hand of the skier. In addition, the novel channel configuration in coordination with the strap pin automatically remove snow and debris away from the locking mechanism preventing the locking mechanism from jamming.

The ski pole strap in one embodiment is made of an elastic material that automatically pulls the pin from the ski pole grip when the button is depressed. The elastic strap when stretched provides a tension that also pulls the top of the ski pole grip toward the skier's wrist. Pulling the top of the ski pole grip toward the skier's wrist in turn angles the bottom of the ski pole upward and forward. Thus, the ski pole is initially held in a "ready to plant" position while the skier is traversing down a ski slope. The elasticity of the strap also expands and contracts according to which direction the ski pole grip moves as the skier plants and turns during a ski run. Thus, the ski pole strap while initially holding the ski pole in a "ready to plant" position, also alters the ski pole to move in any possible planting position.

The elastic ski pole strap allows easy attachment around the wrist of the skier and also allows the strap to remain attached to a ski glove even after the glove is removed from the hand of a skier. Thus, the elastic strap assists in ejecting the strap pin, holding the skier's hand in a "ready to plant" position and simplifying attachment and detachment of the ski pole strap to and from the skier's wrist.

The button can be located at different positions on the ski grip allowing different fingers or different finger positions to be utilized to release the ski pole strap. For example, the locking mechanism can be located at the top or bottom either on the front or lateral side of the ski pole grip. The various button positions allow depression with various fingers on the skier's hand.

The foregoing and other objects, features and advantages of the invention will become more readily apparent from the following detailed description of a preferred embodiment of the invention which proceeds with reference to the accompanying drawings.

DETAILED DESCRIPTION

Figure 1:
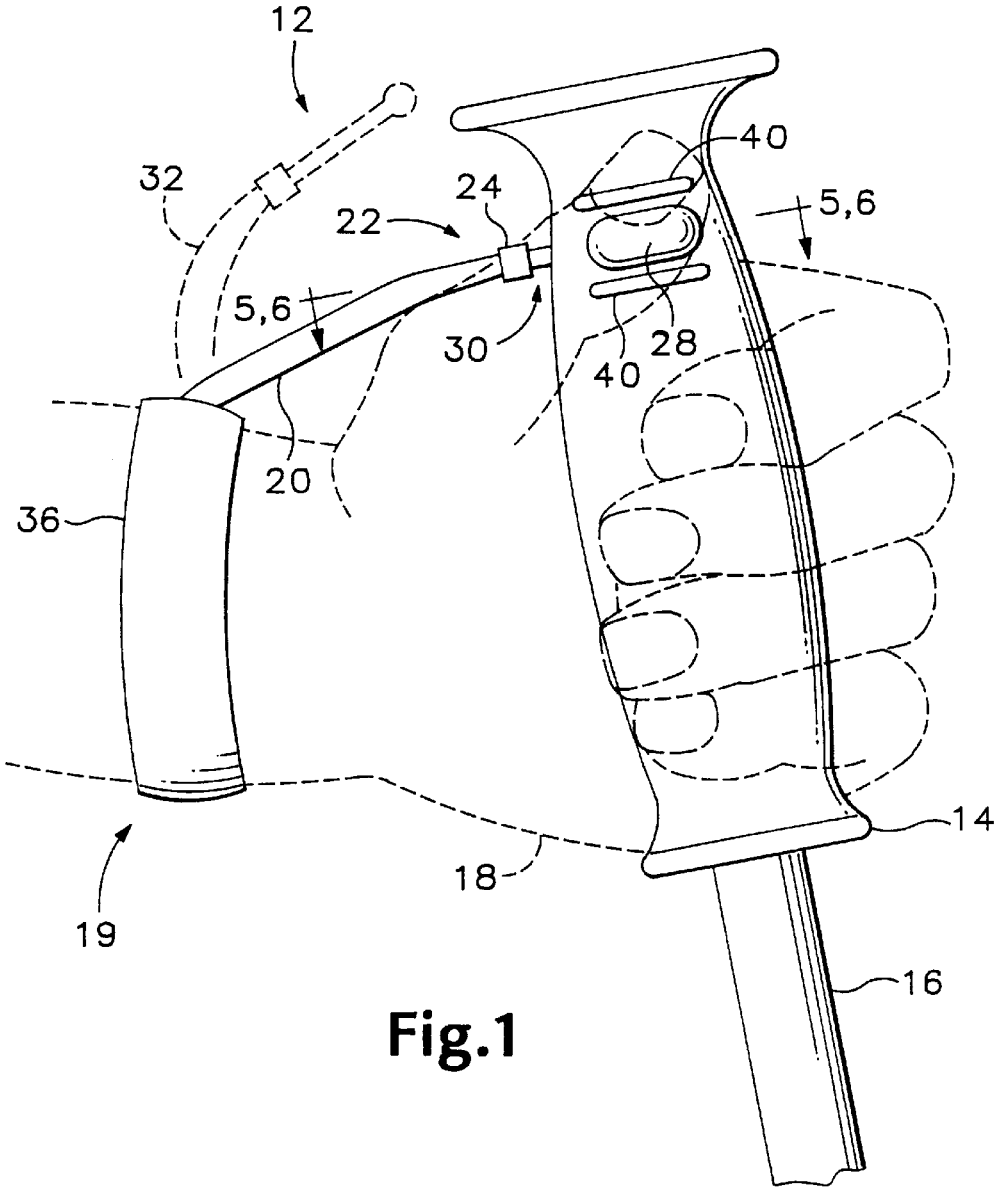
FIG. 1 is a side view of a quick release ski pole strap system according to a first embodiment of the invention.

FIG. 1 is a side view of a quick release ski pole strap system 12 according to a first embodiment of the invention. The ski pole strap system 12 includes a ski pole grip 14 and a ski pole strap 20. The ski pole grip is inserted over a top end of a ski pole 16. The top end *22* of the ski pole strap 20 is connected to a strap pin *24* and a bottom end 36 of the ski pole strap 20 is wrapped around a wrist area 19 of a hand 18 of a skier. A button 28 is located at a top end of the ski pole grip 14.

The ski pole strap 20 can have various configurations depending upon the type of locking mechanism incorporated inside the ski pole grip 14. The type and length of the ski pole strap 20 also change according to how the ski pole grip will rest in the skiers hand. For example, in the embodiment shown in FIG. 1, ski pole strap 20 is made from an elastic material and has a predetermined length of approximately six inches. The length of ski pole strap 20 is such that the strap 20 stretches slightly when strap pin 24 is attached to the top of ski pole grip 14.

The stretched ski pole strap pulls the top end of the ski pole grip 14 toward the wrist area 19 of hand 18. Pulling the top of ski pole grip 14 toward the wrist area 19 is advantageous in keeping the ski pole 16 angled slightly forward and upward in a "ready to plant" position. The ski pole 16 when in the angled position shown in FIG. 1 is in the proper position to plant the ski pole, for example, to initiate a turn. Thus, the ski pole strap 20 assists the skier in holding the ski pole 16 in the proper "ready" position when beginning down a ski slope.

The elasticity of ski pole strap 20 is also sufficient to allow the skier to plant the end of the ski pole 16 (not shown) and move the ski pole grip into any necessary forward position. Thus, the ski strap expands and contracts according to which direction the skier plants and turns.

Figure 10:
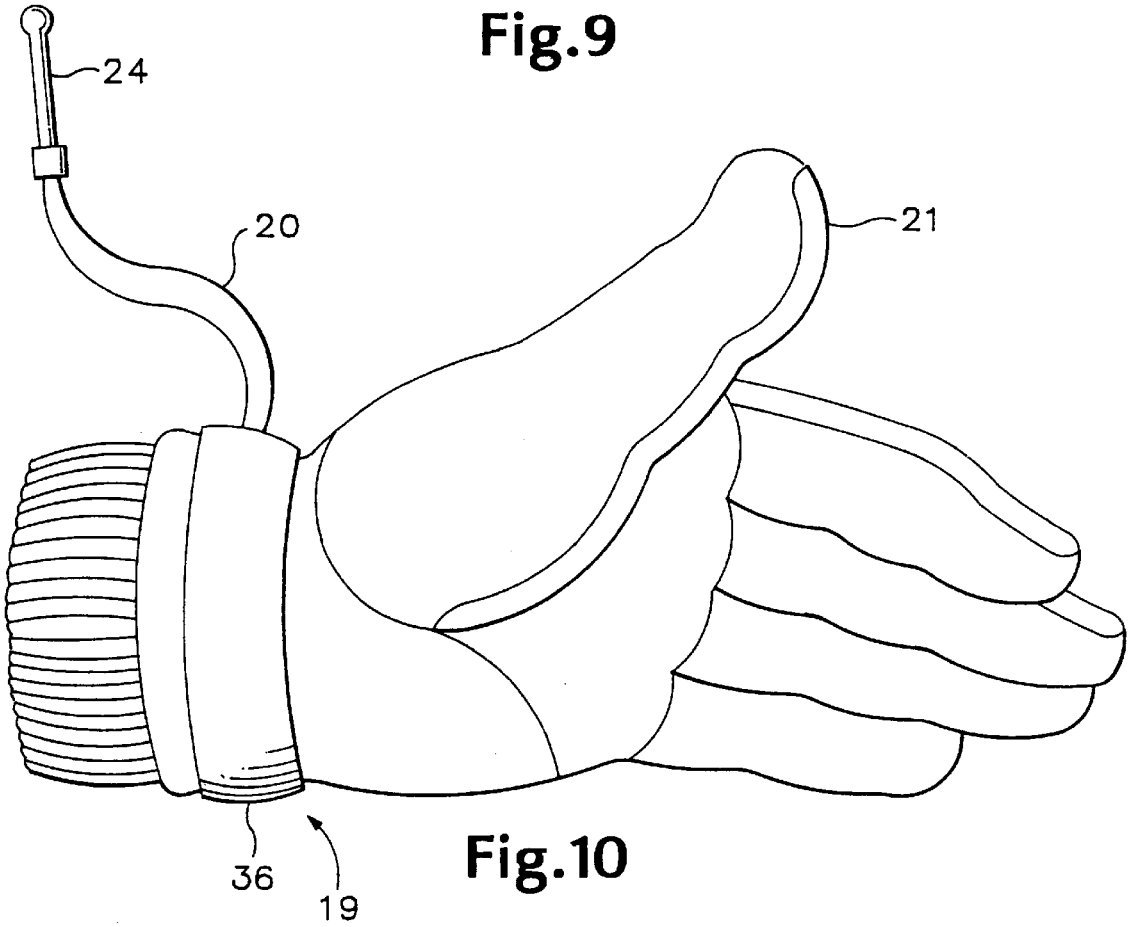
FIG. 10 is a side view of an elastic ski pole strap according to the invention attached to a ski glove.

Referring to FIG. 10, the elastic ski pole strap 20 allows easy attachment around the wrist of the skier. For example, the bottom end 36 of the ski pole strap 20 is simply stretched by the skier and positioned over a ski glove 21 in wrist area 19 and then released. The bottom end 36 of ski pole strap 20 then contracts conforming snugly around the ski glove 21. The elastic ski strap also allows the skier to both remove the glove 21 and the ski pole strap 20 at the same time.

For example, the bottom end 36 of ski pole strap 20 is snugly secured around the skier's wrist or, typically, around the glove 21. Thus, the skier after detaching the strap pin 24 from the ski pole grip 14, can remove the glove 21 while the strap 20 remains wrapped around a lower end of the glove. Because of the elasticity of ski pole strap 20, the bottom end 36 expands as the skier's hand is removed from the glove. However, after the hand is removed, the strap contracts holding the strap snugly around the ski glove 21.

Referring back to FIG. 1, the compression force of ski pole strap 20 when in the expanded position also automatically pulls the strap pin 24 from ski pole grip 14 when button 28 is depressed. The ski pole strap 20 is shown by phantom lines 32 immediately after strap pin 24 is released from the ski pole grip 14. Thus, the skier is automatically released from the ski pole grip 14 without having to manually pull the pin 24 from the ski pole grip 14.

Automatic release of the strap pin 24 allows the skier to wait until the last instant before removing his hands from the ski pole grip 14. Therefore, the skier does not have to start removing the ski pole strap 20 a long time before entering the ski lift, for example, while still skiing. Thus, the ski pole strap arrangement shown in FIG. 1 is safer than traditional ski pole straps since the skier does not have to both remove straps and ski at the same time.

The bottom end 36 of ski pole strap 20 is attached to the wrist area 19 by various methods in addition to the elastic strap shown in FIG. 1. For example, the lower section 36 of ski pole strap 20 can be attached with VELCRO® having a eye section capable of attaching with a hook section. The "hook and eye" configuration is sized to attach around a wide variety of wrist sizes. A wide variety of alternative attachment schemes such as a snap can be utilized to also secure the ski pole strap 20 around the wrist of the skier.

The button 28 extends vertically out a lateral side of ski pole grip 14. The position of button 28 allows the thumb of hand 18 to easily move up from a standard gripping position to a trigger position over button 28 as shown in FIG. 1. It is important to note that the hand 18 remains wrapped around the skip pole grip 14 while button 28 is being depressed. This increases ease and safety by allowing the skiers hands to keep a secure grip on the ski pole grip 14 at the same time that the ski pole strap 20 is being released.

Figure 9:
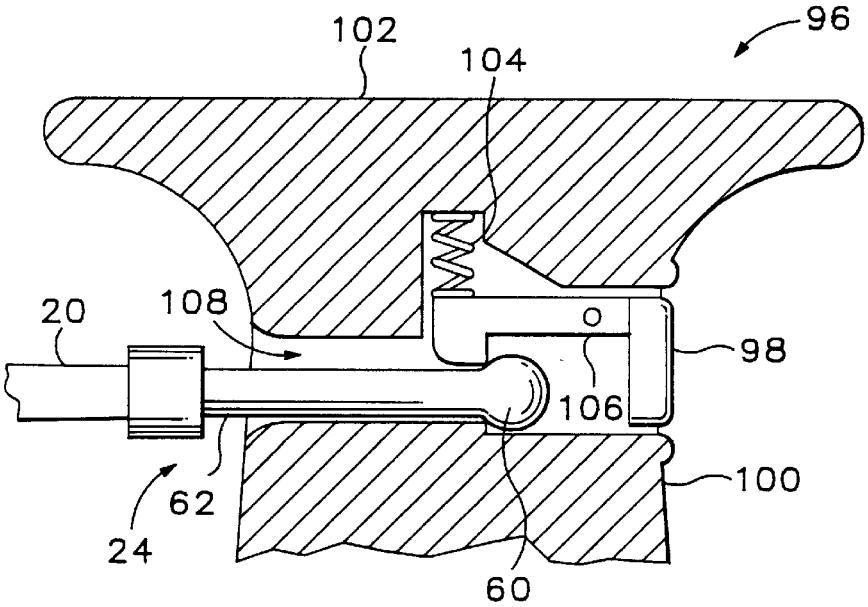
FIG. 9 is a side section of a ski pole strap system with a button located on a front facet of a ski pole grip.

The button 28 can be located at other locations on the ski pole grip 14 while still allowing the skier to release the ski pole strap 20 and hold on to the ski pole grip 14 at the same time. For example, the button 28 can be located on either lateral side of the ski pole grip 14. Thus, either the skier's index finger or thumb can be used to depress button 28. Alternatively, the button 28 can be located at the bottom of the ski pole grip so that the skier's pinky can initiate the release of ski pole strap 20. An alternative embodiment of the invention having a button extending from the front of the ski pole grip is shown in FIG. 9.

Referring back to FIG. 1, a pair of elevated protrusions 40 extend around the top and bottom of button 28 to prevent inadvertent triggering. For example, when the skier falls during a ski run, sections 40 prevent the force of the ground from inadvertently triggering button 28. Alternatively, button 28 can be recessed below the outside surface of ski pole grip 14 to also prevent unintentional activation.

Figure 2:
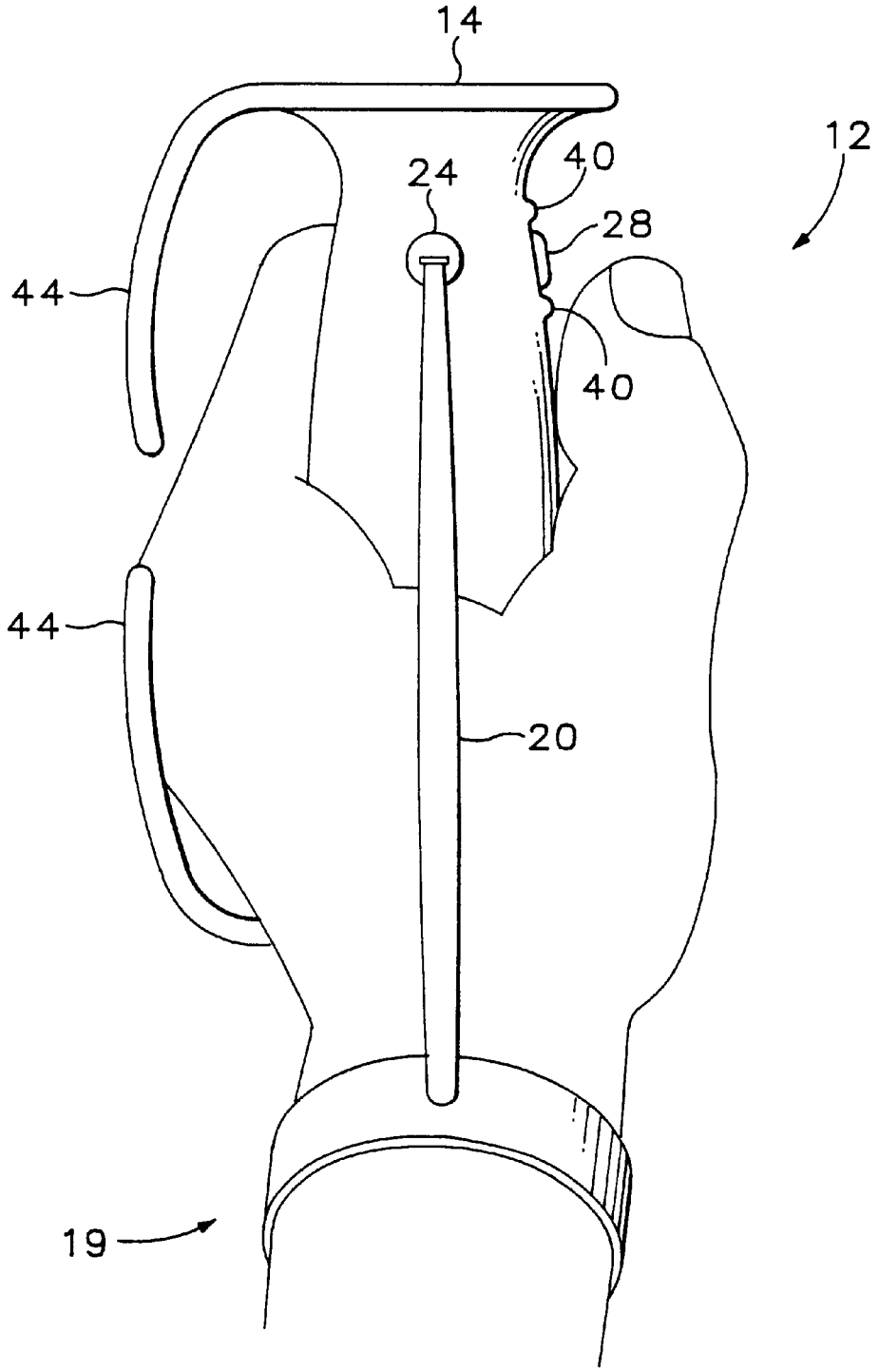
FIG. 2 is a front view of the ski pole strap system shown in FIG. 1.

The quick release ski pole strap system 12 can be utilized with any type of ski pole grip. For example, FIG. 2 is a back view of the ski pole grip 14 shown in FIG. 1. The ski pole grip 14 includes molded side straps 44. As describe above, the ski pole grip 14 by itself is minimally effective in holding the hand of a skier in a ski pole. For example, the ski pole 16 (FIG. 1) if not combined with the ski pole strap system 12 will be lost if the skier inadvertently releases his hand from the ski pole grip.

Incorporating the ski pole strap system 12 to the ski pole grip 14, offers two separate means (i.e., straps 44 and ski pole strap 12 for coupling the skiers hand to the ski pole. However, the assembly in FIG. 2 has the added advantage that the skier is still able to quickly separate his hand from the ski pole grip 14. Alternatively, the ski pole grip can be a single molded vertical piece without the straps 44.

It can be seen in FIG. 2 that the ski pole strap 20 extends up from the wrist area 19 between the thumb and forefinger and into a back side of the ski pole grip 14. The ski pole strap 20, pin 24 and button 28 are positioned for quick and unobstructed strap release. For example, by placing button 28 on the lateral side of ski pole grip 14, the skier's thumb can be moved over the button 28 without getting entangled with strap 20 or strap pin 24. In an alternative embodiment, as shown in FIG. 9, the button [98] *28* can be location on the front side of the ski pole grip 14.

Figure 3:
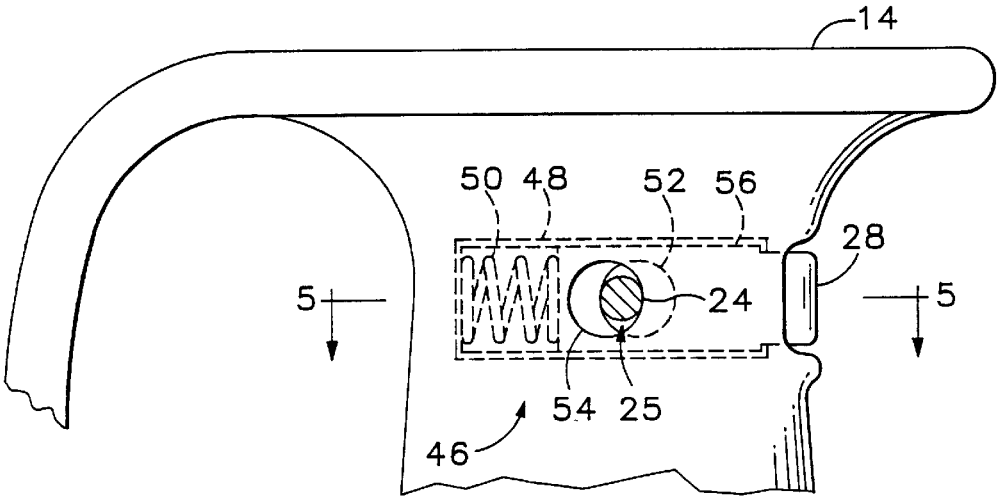
FIG. 3 is an enlarged front view of a top portion of the ski pole shown in FIG. 1.

FIG. 3 is a detailed front view of the ski pole grip 14 and locking mechanism 46 used to attach the strap pin 24 inside ski pole grip 14. A cylinder 48 in ski pole grip [14] *42* houses a button cylinder 56 and a spring 50. A hole 54 extends through ski pole grip 14 perpendicular to cylinder 48 and button cylinder 56 contains a hole 52. Button cylinder 56 slides within cylinder 48 between a locked position and an unlocked position. In the locked position, holes 52, 54 are offset so as to provide an opening 25.

By depressing button 28, button cylinder 56 slides inside cylinder 48 compressing spring [50] *52*. As button 28 is depressed, hole 52 coaxially aligns with hole 54. When holes 52 and 54 become aligned, the strap 20 (FIG. 1) pulls the strap pin 24 out from cylinders 48 and 56 and away from ski pole grip 14. Button 28 is then released and spring 50 pushes button cylinder 56 back into a decompressed position extending button 28 slightly out of ski pole grip 14.

Figure 4:
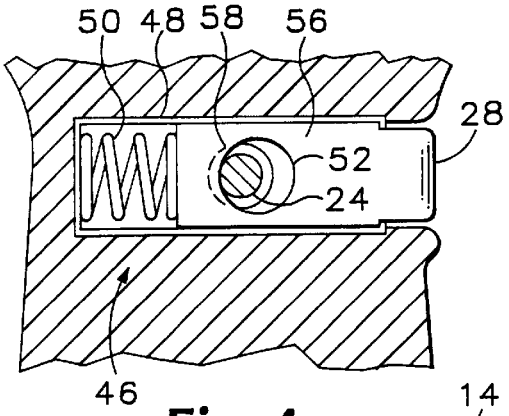
FIG. 4 is a vertical section of the ski pole strap system shown in FIG. 1.

FIG. 4 is a front section of the locking mechanism 46 shown in FIG. 3. The button cylinder 56 has a circular cross-sectional shape that is received by cylinder 48. Another hole 58 is located on a rear side of cylinder 48.

Figure 5:
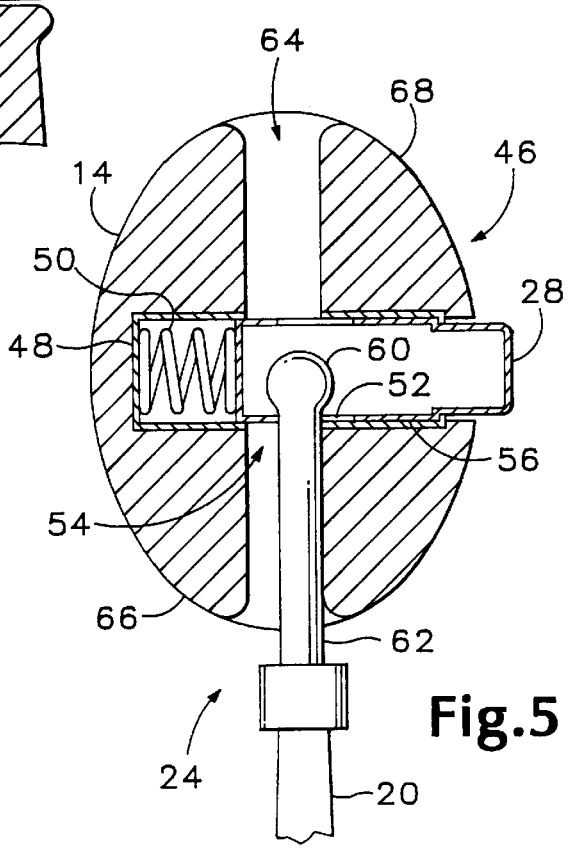
FIG. 5 is a cross section of the ski pole strap system taken along line 5—5 shown in FIG. 1.

FIG. 5 is a sectional view of the ski pole strap locking mechanism 46 shown in FIG. 3. The strap pin 24 includes a bulb shaped end 60 and a back section 62. The strap pin 24 has a circular cross-section that is substantially the same shape as a channel 52 in ski pole grip 14. Thus, the strap pin 24 can be inserted into the channel 64 at any angle about a vertically aligned longitudinal axis.

Referring to FIGS. 3–5, when strap pin 24 is inserted into channel 64 the front end 60 of strap pin 24 forces button cylinder 56 sideways, compressing spring 50. Button cylinder 56 is moved inward until hole 54 in cylinder 48 and hole 52 in button cylinder 56 coaxially align. The aligned holes have a sufficiently sized diameter to receive front end 60.

As front end 60 moves inside button cylinder 56, button cylinder 56 is pushed back by spring 50 against section 62 clamping button cylinder 56 and cylinder 48 against opposite sides of the section 62. Since the diameter of opening 25 is now smaller than the diameter of strap pin end 60, strap pin 24 is locked into ski pole grip 14. It is important to note that strap pin 24 is locked into the ski pole grip 14 without having to depress button 28. This allows faster and easier attachment of ski pole strap 20 to ski pole grip 14.

The channel 64 extends from a front side 66 to a back side 68 of the ski pole grip 14 so that the strap pin 24 can be inserted from either the front or back side of the ski pole grip 14. As previously shown in FIG. 1, the button 28 is centered between the front and back sides 66 and 68, respectively of the ski pole grip 14. Thus, the skiers thumb can press button 28 regardless of whether the skier's hand is wrapped around the ski pole grip 14 from the front side 66 or from the back side 68. Therefore, the ski pole strap system 12 can be used on either hand.

For example, when ski pole grip 14 is held in the left hand, strap pin 24 is inserted into channel 64 as shown in FIG. 5. However, if ski pole grip 14 is held in the right hand, strap pin 24 is inserted into channel 64 from the backside 68. Both cylinder 48 and button cylinder 56 have holes facing the front and back side of the ski pole grip.

Because channel 64 extends through the entire ski pole grip 14, the ski strap system 12 is resistent to jamming. For example, it is possible for snow to enter channel 64 during a ski crash. However, strap pin 24 when inserted into either end of channel 52 pushes debris out the opposite end of the ski pole grip 14. Therefore, channel 64 is automatically cleaned each time strap pin 24 is inserted ensuring proper operation of locking mechanism 46.

Figure 6:
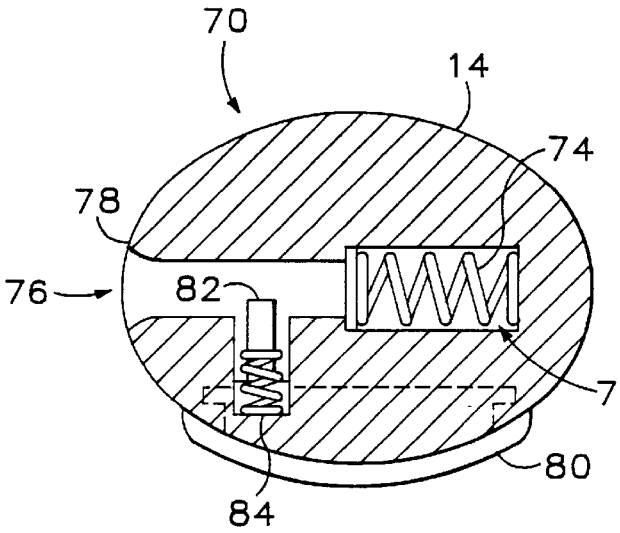
FIG. 6 is a cross section of the ski pole strap system of FIG. 1 taken along [lie] *line* 6—6 with an automatic eject system according to a second embodiment of the invention.
Figure 7:
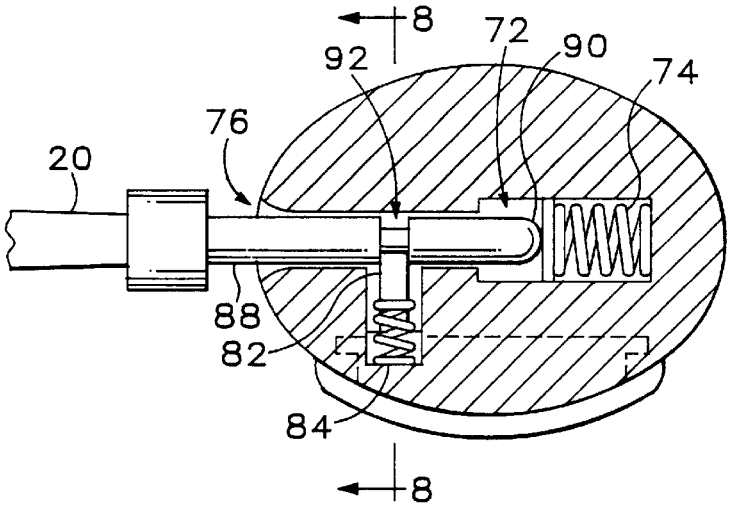
FIG. 7 is the cross section shown in FIG. 6 with a fully inserted strap pin.
Figure 8:
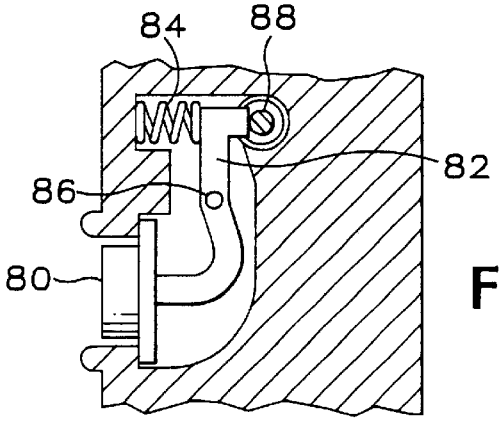
FIG. 8 is a side section of the automatic eject system shown in FIG. 6.

FIGS. 6–8 show a second embodiment of the invention using a self ejecting locking mechanism 70. Specifically, FIG. 6 shows a cross section of the automatic eject mechanism, FIG. 7 shows the locking mechanism of FIG. 6 with an inserted strap pin 88, and FIG. 8 shows a back section of the automatic eject system.

A cavity 72 contains a spring 74. A channel 76 extends from the front side 78 of ski pole grip 14 to cavity 72. A button 80 is coupled to a finger 82 and is held down into channel 76 by a spring 84. The finger 82 is joined to the ski pole grip 14 by a pin 86.

Referring to FIGS. 6–8 the operation of the automatic eject system is now described. The strap pin 88 is inserted into channel 76 whereby a front end 90 pushes finger 82 out of channel 76 allowing the strap pin 88 to be fully inserted into the ski pole grip 14. Strap pin 88 begins to compress spring 84 as the front end 90 extends into cavity 72. As strap pin 88 inserts further into cavity 72, spring 84 pushes finger 82 into a notch 92 locking strap pin 88 into the ski pole grip 14.

Strap pin 88 is ejected from cavity 72 and channel 76 by depressing button 80 causing finger 82 to pivot about pin 86 pushing finger 82 out from notch 92. When finger 82 is removed from notch 92, spring 74 is allowed to expand completely ejecting strap pin 88 from channel 76.

The automatic ejection mechanism 70 shown in FIGS. 6–8 is used instead of the elastic ski pole strap 20 (FIG. 1) to eject the strap pin 88. Thus, ski pole strap 20 can also be made from a standard strap material such as leather and still automatically eject from ski grip 14. It should also be noted that the automatic eject system can also be easily modified by one with average skill in the art so that strap pin 88 is insertable from either the front or back side of ski pole grip 14.

FIG. 9 is a side section showing a locking mechanism 96 having a button 98 located at a rear end 100 of the ski pole grip 102. A spring 104 pushes an arm 106 down into a channel 108.

Strap pin 24 is locked into the ski pole grip 102 by inserting the strap pin 24 into channel 108. Front end 60 of strap pin 24 pushes arm 106 upward compressing spring 104. As front end 60 moves further into channel 108, spring 104 pushes arm 106 against section 102. Strap pin 24 is released by pressing button 98 with the skier's fore finger. Arm 106 is then raised allowing elastic strap 20 to pull strap pin 24 from channel 108. For safety, the strap pin 24 can be pulled from channel 76 even when the pin 24 is locked to finger 82. For example, if a skier falls during a ski run, the ski pole may be firmly lodged in the snow while the skier continues to fall down the ski hill. A large enough force applied away from the ski pole grip 14 forces the pin 24 to disengage from finger 82 and allows the pin 24 to eject from channel 76. Thus, the ski straps will automatically detach from the ski pole grip during extreme bailments during a ski run.

The overall operation of the quick release ski pole strap system is now briefly described. Before, beginning a ski run at the top of a slope, the skier wraps the bottom end 36 of ski pole strap 20 around the wrist area of a glove. The skier then inserts the strap pin 24 into the channel 64 locking the ski pole strap 20 to the ski pole grip 14. The skier then begins a ski run. The length of ski pole strap 20 can be sized as described above so that the top end of ski pole grip 14 is pulled slightly toward the wrist of the skier providing additional support for holding the ski pole 16 in a forwardly extended "ready to plant" position.

As the skier plants the ski pole 16, ski pole strap 20 stretches as the ski pole grip 14 moves forward. A longer ski pole strap is used when it is not desirable to hold the ski pole grip 14 toward the wrist area 19 of the skier. In this situation, an automatic eject mechanism as shown in FIGS. 6–8 is used.

After the skier has completed the ski run and approaches the ski lift, the skier disconnects the ski pole strap 20 from the ski pole grip 14 simply by depressing button 28. The ski pole strap 20 thereby remains wrapped around the skiers wrist while riding up a ski lift. While the skier is transported to the top of the ski lift, the strap 20 is locked back onto the ski pole grip 14 by simply inserting strap pin 24 into channel 64.

If the skier wishes to remove the ski glove, the ski pole straps 20 remain wrapped around the ski gloves, preventing the ski pole straps from being misplaced.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A quick release attachment system for coupling a hand of a skier to a ski pole, comprising:

a ski pole grip having a front side and back side, joined by opposite lateral sides and having a cross-sectional shape sized so that the hand of the skier can be wrapped around the ski pole grip in a griping manner;

a strap having a first and second end, the first end attached to the skier;

a strap pin attached to the second end of the strap;

an attachment mechanism disposed within the ski pole grip for receiving and locking the strap pin to the ski pole grip;

an ejection mechanism;

an elongated channel extending in a horizontal direction into the front side of the ski pole grip above the hand of the skier while said hand is wrapped around the ski pole grip, the strap pin inserting horizontally into the channel and engaging with the attachment mechanism while moving the ejection mechanism into a compressed cocked position; and a button extending from one of the lateral sides of the ski pole grip and mechanically coupled to the attachment mechanism, the button depressible by the hand of the skier disengaging the attachment mechanism from the strap pin allowing the ejection mechanism to uncock, the ejection mechanism when uncocked ejecting the strap pin horizontally from the channel out over a top end of the hand of the skier while said same hand of the skier remains wrapped around the ski pole grip.

2. An attachment system according to claim 1 wherein the button has an elongated front face that extends horizontally from substantially the front to the back side of the ski pole grip, the front face allowing button actuation by either a thumb or a forefinger of the hand while the remaining fingers on said hand remain wrapped around the ski pole grip.

3. An attachment system according to claim [7] *2* wherein the button is recessed below an outside surface of the ski pole grip.

4. An attachment system according to claim 1 wherein the ejection mechanism comprises a spring compressible in a horizontal direction inside the ski pole grip, the spring in the cocked position having sufficient compressional force to eject the strap pin completely out of the channel when the attachment mechanism disengages the strap pin.

5. An attachment system according to claim 1 wherein the strap pin includes a notch extending circumferentially around an outside surface and the attachment mechanism comprises a finger pivotally coupled to a pin in the ski pole grip, the finger extending transversely over the strap pin and into the notch for retaining said strap pin in the channel.

6. An attachment system according to claim 1 wherein the attachment mechanism comprises a finger and an attachment spring for springingly pressing the finger against the strap pin, the attachment spring compressible in a direction perpendicular to the horizontal direction of the channel.

7. An attachment system for securing a hand of a skier to a ski pole, comprising:

a ski pole grip having a front and back and sides contoured for gripping with the hand of the skier;

a strap having a first and second end, the first end attached to the skier;

an elongated tubular strap pin attached to the second end of the strap;

an attachment mechanism disposed within the ski pole grip for receiving and locking the strap pin to the ski pole grip;

an ejection mechanism disposed inside the ski pole grip;

an elongated circular channel extending horizontally into the ski pole grip, the strap pin inserting horizontally into the channel and engaging with the attachment mechanism while moving the ejection mechanism into a compressed cocked position; and a button coupled to the attachment mechanism and depressible with the hand of the skier, the button in the depressed condition disengaging the strap pin from the attachment assembly allowing the ejection mechanism to uncock thereby ejecting the strap pin completely out of the channel while the same hand of the skier remains wrapped around the ski pole grip.

*8. A quick release attachment system for coupling a hand of a skier to a ski pole, comprising:*

*a ski pole grip having a front side and back side, joined by opposite lateral sides and having a cross-sectional shape sized so that the hand of the skier can be wrapped around the ski pole grip in a griping manner;*

*a pin attached to the hand of a skier;*

*an attachment mechanism disposed within the ski pole grip for receiving and locking the pin to the ski pole grip;*

*an ejection mechanism;*

*an elongated channel extending in a horizontal direction into the front side of the ski pole grip substantially above the hand of the skier while said hand is wrapped around the ski pole grip, so that the pin can insert horizontally into the channel and engage with the attachment mechanism while moving the ejection mechanism into a cocked position; and*

*a button extending from the ski pole grip and mechanically coupled to the attachment mechanism, the button depressible by a thumb on the hand of the skier disengaging the attachment mechanism from the pin causing the ejection mechanism to eject the pin horizontally from the channel out over a top end of the hand of the skier while said same hand of the skier remains wrapped around the ski pole grip.*

*9. A quick release attachment system according to claim 8 wherein the ejection mechanism comprises a strap.*

*10. A quick release attachment system for coupling a hand of a skier to a ski pole, comprising:*

*a ski pole grip having a front side and back side, joined by opposite lateral sides and having a cross-sectional shape sized so that the hand of the skier can be wrapped around the ski pole grip in a griping manner;*

*a pin connected to a glove of a skier, the pin having an end portion which includes a notch;*

*an attachment mechanism disposed within the ski pole grip for receiving and releasably locking the pin to the ski pole grip; the attachment mechanism including:*

*an elongated channel extending in a horizontal direction into the front side of the ski pole grip above the hand of the skier while said hand is wrapped around the ski pole grip;*

*a retractable finger protruding across a portion of the channel, the pin inserting horizontally into the channel and engaging the notch with the finger; and*

*a button on the ski pole grip and mechanically coupled to the finger, the button depressible by a thumb on the hand of the skier to retract the finger from the notch in the end portion of the pin, causing the pin to detach from the attachment mechanism and move out of the channel and toward a top end of the hand of the skier while same hand of the skier remains wrapped around the ski pole grip; and*

*an ejection mechanism configured to eject the pin from the channel.*

*11. A quick release attachment system according to claim 10 in which the finger is moveable between a first position engaging the notch and a second position out of the notch, the attachment mechanism further including a spring biasing the finger into the first position.*

*12. A quick release attachment system for coupling a hand of a skier to a ski pole, comprising:*

*a ski pole grip having a front side and back side, joined by opposite lateral sides and having a cross-sectional shape sized so that the hand of the skier can be wrapped around the ski pole grip in a gripping manner;*

*a pin connected to a glove of a skier, the pin having an end portion which includes a notch;*

*an attachment mechanism disposed within the ski pole grip for receiving and releasably locking the pin to the ski pole grip; the attachment mechanism including:*

*an elongated channel extending in a horizontal direction into the front side of the ski pole grip above the hand of the skier while said hand is wrapped around the ski pole grip;*

*a retractable finger protruding across a portion of the channel, the pin inserting horizontally into the channel and engaging the notch with the finger;*

*a button on the ski pole grip and mechanically coupled to the finger, the button depressible by a thumb on the hand of the skier to retract the finger from the notch in the end portion of the pin, allowing the pin to detach from the attachment mechanism and move out of the channel and toward a top end of the hand of the skier while same hand of the skier remains wrapped around the ski pole grip;*

*an elastic strap sized to length to connect the pin to the glove on the hand of the skier under tension so that, upon depressing the button, the strap can pull the pin out of the attachment mechanism; and*

*an ejection mechanism configured to eject the pin from the channel.*

* * * * *

UNITED STATES PATENT AND TRADEMARK OFFICE

CERTIFICATE OF CORRECTION

PATENT NO. : RE 38,573 E
APPLICATION NO. : 09/140831
DATED : August 31, 2004
INVENTOR(S) : Wells It is certified that error appears in the above-identified patent and that said Letters Patent is hereby corrected as shown below:

On the Title Pg, Item -56-

Under FOREIGN PATENT DOCUMENTS, please add --JP4-51976(A) 06/18/90 Miyoshi 280/822--

In Figure 9, please replace reference number "62" with --62'--

Signed and Sealed this

Sixth Day of October, 2009

David J. Kappos

David J. Kappos
*Director of the United States Patent and Trademark Office*